(12) United States Patent
Yoshihara et al.

(10) Patent No.: US 8,009,249 B2
(45) Date of Patent: Aug. 30, 2011

(54) LIQUID CRYSTAL DISPLAY DEVICE

(75) Inventors: Toshiaki Yoshihara, Kawasaki (JP);
Tetsuya Makino, Kawasaki (JP);
Keiichi Betsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 323 days.

(21) Appl. No.: 11/496,990

(22) Filed: Jul. 31, 2006

(65) Prior Publication Data

US 2007/0063925 A1    Mar. 22, 2007

Related U.S. Application Data

(63) Continuation of application No. PCT/JP2004/006363, filed on Apr. 30, 2004.

(51) Int. Cl.
*G02F 1/1347* (2006.01)

(52) U.S. Cl. .......................................................... 349/77

(58) Field of Classification Search ...................... 349/77
See application file for complete search history.

(56) References Cited

U.S. PATENT DOCUMENTS

| | | | |
|---|---|---|---|
| 5,495,351 A | 2/1996 | Shingaki et al. | |
| 5,847,790 A | 12/1998 | Andersson et al. | |
| 6,130,731 A | 10/2000 | Andersson et al. | |
| 2002/0000960 A1 | 1/2002 | Yoshihara et al. | |

FOREIGN PATENT DOCUMENTS

| | | |
|---|---|---|
| EP | 0 933 663 | 8/1999 |
| JP | 63-085525 | 4/1988 |
| JP | 1-177019 A | 7/1989 |
| JP | 2-54527 | 11/1990 |
| JP | 3-505013 | 10/1991 |
| JP | 4-124615 A | 4/1992 |
| JP | 5-002166 A | 4/1992 |
| JP | 11-119189 | 4/1999 |
| JP | 2004-109814 | 4/2004 |
| WO | WO99/04315 | 1/1999 |

OTHER PUBLICATIONS

Yoshihara et al.; "A full-Color Vide Rate FLC Display Based on a Time Domain Color Switching with a TFT Array"; 17th Int'l. Liquid Crystal Conference, p. 25; P1-74; Jul. 19-24, 1998.

Yoshihara et al.; "A Full-Color FLC Display Based on Field Sequential Color with TFTs"; AM-LCD '99 Digest of Technical Papers, p. 185; Jul. 14-16, 1999.

Yoshihara et al.; "Invited Paper: A 254-ppi Full-Color Vide Rate TFT-LCD Based on Field Sequential Color and FLC Display"; SID '00 Digest of Technical Papers, p. 1176; May 2000.

Date et al.; "Luminance Additivity in Compact Depth-Fused-3D Display Using a Stack of Two TN-LCDs"; IDW '03 Proceedings of the 10th Int'l. Display Workshops, p. 1409; 2003.

Mochizuki et al.; "Zigzag Defect Free Alignment and Good Bistability of Surface Stabilized Se Cells"; Ferroelectrics 1991, vol. 113, p. 353-359.

Japanese Office Action mailed Jun. 9, 2009 for JP App. No. 2006-512716. A partial English-language translation is provided.

Yoshino, Katsumi et al., "Fundamental of Liquid Crystal and Display", May 20, 1994, pp. 230233, partial English translation.

*Primary Examiner* — Jerry Rahll
(74) *Attorney, Agent, or Firm* — Fujitsu Patent Center

(57) ABSTRACT

In a liquid crystal display device that carries out image display using multiple liquid crystal panels stacked, the average change in the direction of the optical axis due to the response of liquid crystal molecules with respect to the applied voltage, that is, the change in the direction of the long axis of the liquid crystal molecules with respect to the applied voltage, is made different among the liquid crystal panels. The desired brightness is attained at the overlaid portion of the liquid crystal panels.

10 Claims, 15 Drawing Sheets

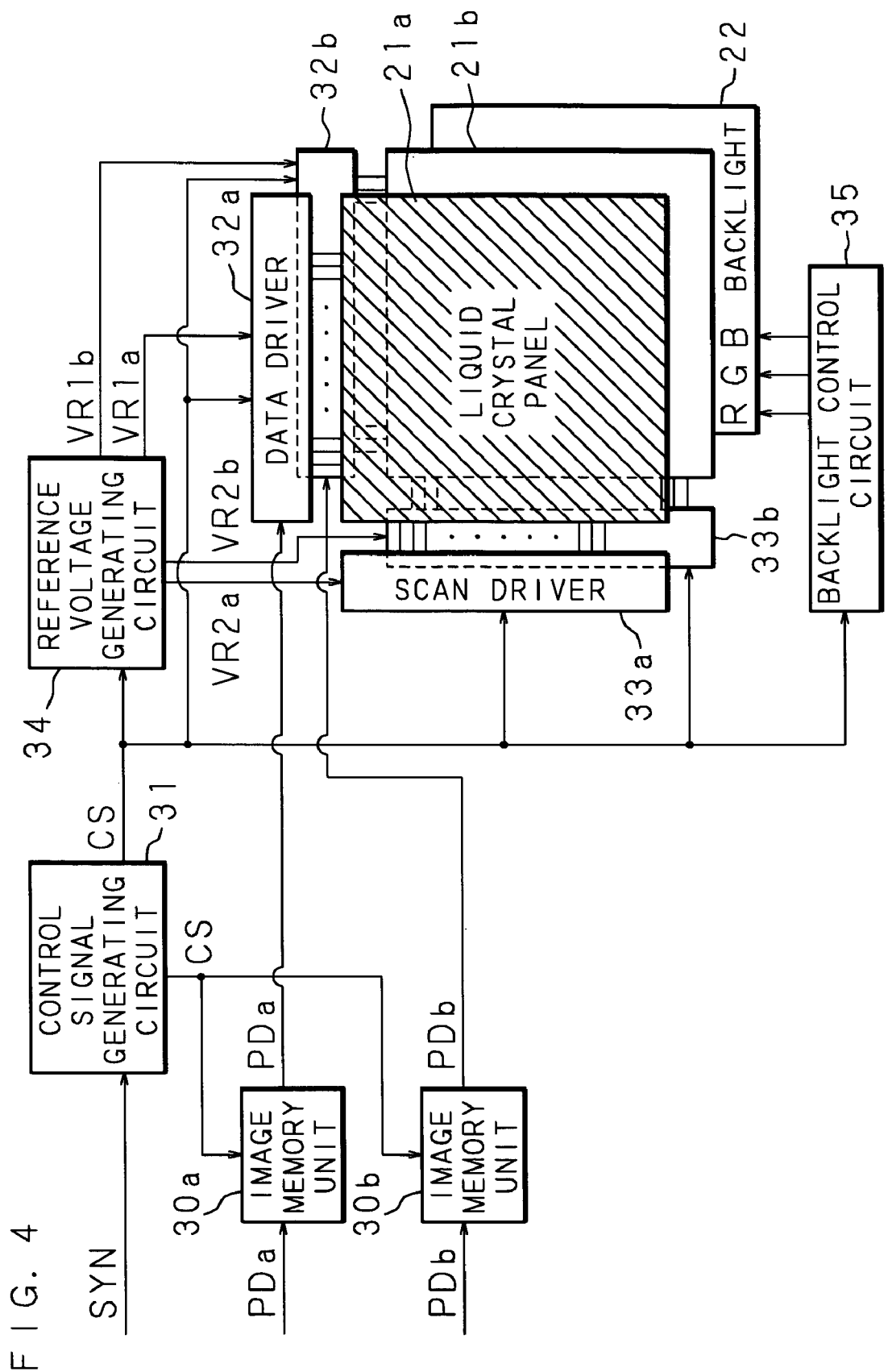

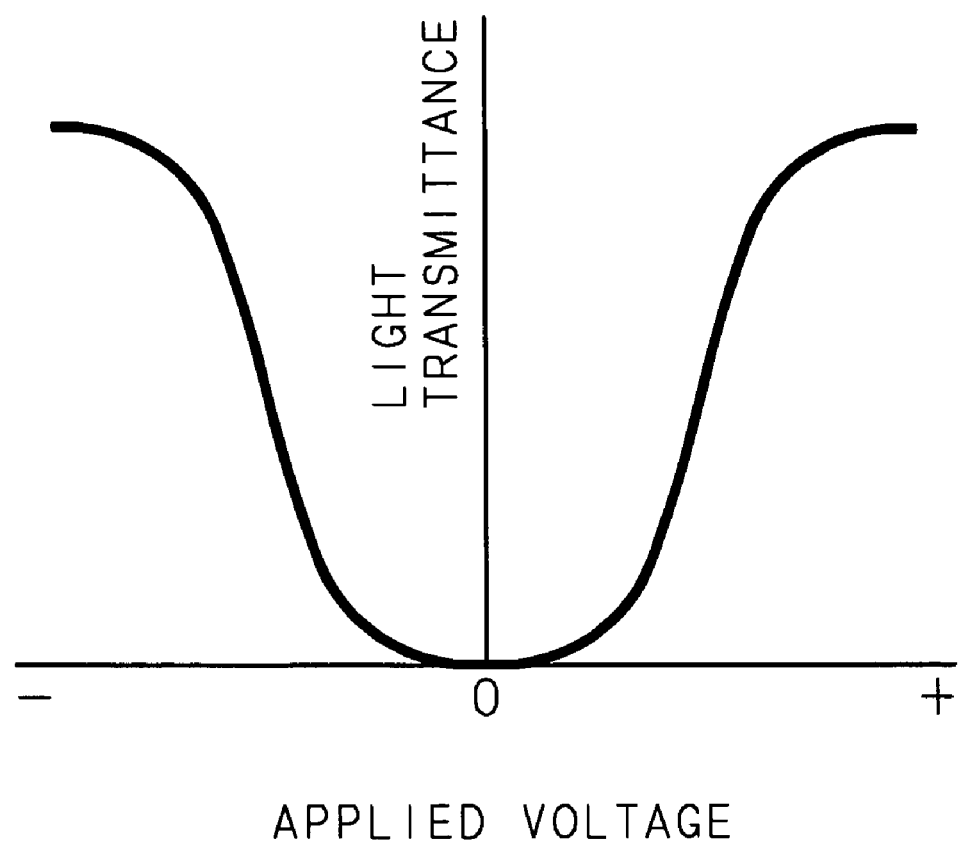
F I G. 14

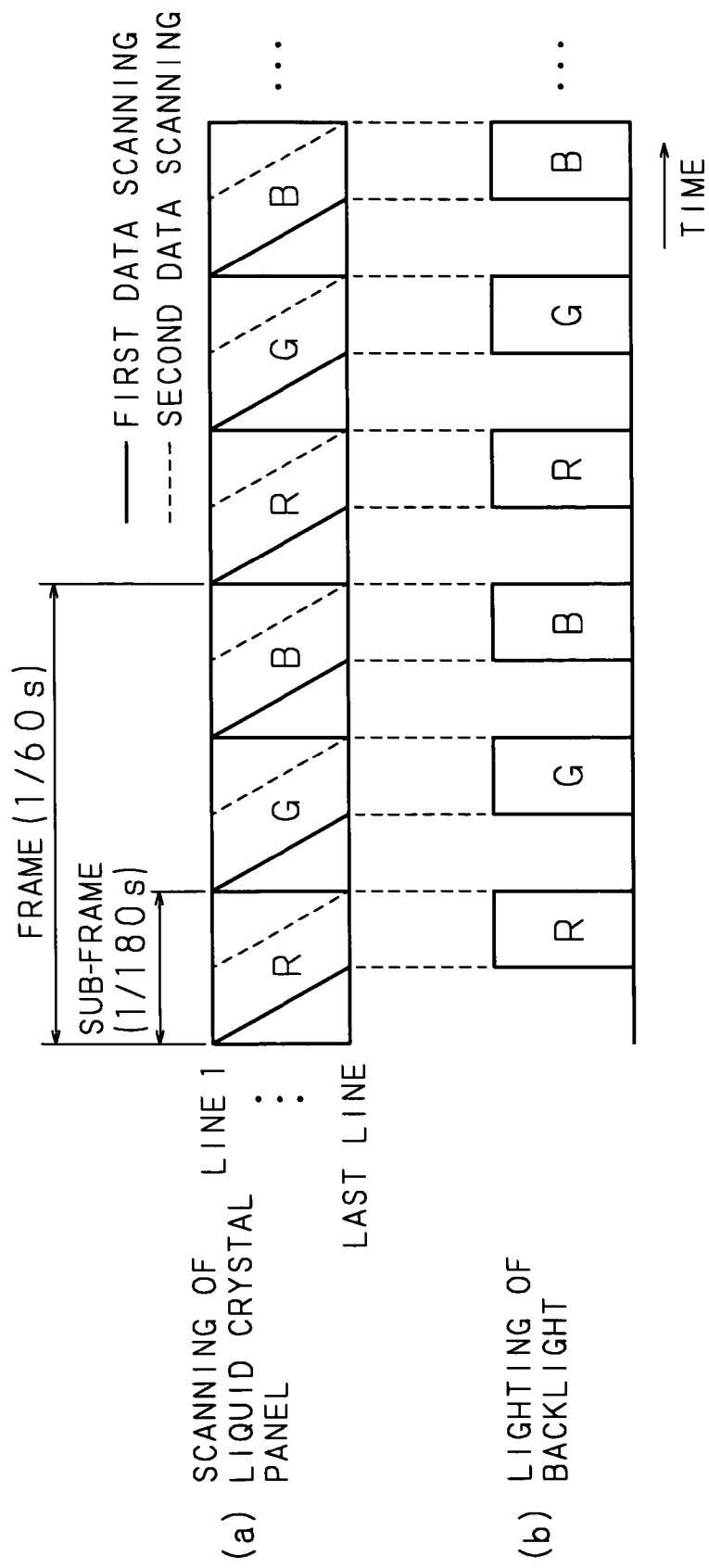

LIQUID CRYSTAL DISPLAY DEVICE

This application is a continuation of PCT International Application No. PCT/JP2004/006363 which has an International filing date of Apr. 30, 2004 and designated the United States of America.

TECHNICAL FIELD

The present invention relates to a liquid crystal display device, more particularly, to a liquid crystal display device that carries out image display using multiple liquid crystal panels stacked.

BACKGROUND ART

Along with the recent development of the so-called information-oriented society, electronic apparatuses, such as personal computers and PDA (Personal Digital Assistants), have been used widely. With the spread of such electronic apparatuses, portable apparatuses that can be used in offices as well as outdoors have been demanded, and these apparatuses are requested to be made small in size and light in weight. Liquid crystal display devices are widely used as one of the means for satisfying such requests. Liquid crystal display devices include not only the technology that makes the apparatuses small in size and light in weight but also the technology that is indispensable to reduce the power consumption in portable electronic apparatuses driven by batteries.

Liquid crystal display devices are broadly classified into a reflection type and a transmission type. The reflection type is configured so that light rays incident from the front face of a liquid crystal panel are reflected by the rear face of the liquid crystal panel, and an image is made visible using the reflected light; the transmission type is configured so that an image is made visible using the transmitted light from a light source (backlight) provided on the rear face of the liquid crystal panel. The reflection type has poor visibility because the amount of the reflected light varies depending on environmental conditions; hence, transmission type color liquid crystal display devices using color filters are generally used as the display devices of personal computers for carrying out full-color display in particular.

As the color liquid crystal display devices, active-driven liquid crystal display devices using switching elements, such as TFTs (Thin Film Transistors), are widely used at present. Although the TFT-driven type liquid crystal display devices are relatively high in display quality, they require a high-intensity backlight to obtain high screen brightness because the light transmittance of the liquid crystal panel thereof is low, several percent. For this reason, the power consumption increases due to use of the backlight. Furthermore, the liquid crystal is low in responsivity to an electric field and has a problem of low speed of response, that is, a problem that the speed of response is low in halftones, in particular. Moreover, because color display is carried out using color filters, a single pixel must be formed of three sub-pixels; hence, it is difficult to obtain a high-resolution display, and the purity of the displayed colors is not sufficient.

In order to solve these problems, the present inventors have developed field-sequential type liquid crystal display devices (see, for example, T. Yoshihara et al., ILCC 98, P1-074, 1998; T. Yoshihara et al., AM-LCD '99 Digest of Technical Papers, p. 185, 1999; and T. Yoshihara et al., SID '00 Digest of Technical Papers, p. 1176, 2000).

Because the field-sequential type liquid crystal display device does not require sub-pixels, the liquid crystal display device can easily attain higher resolution display in comparison with the color-filter type liquid crystal display device; furthermore, because the field-sequential type liquid crystal display device can directly use the colors emitted from the light source without using color filters, the displayed colors are excellent in purity. Moreover, because the light utilization efficiency is high, the liquid crystal display device has the advantage of low power consumption. However, high-speed responsiveness (2 ms or less) is essential for the liquid crystal in order to realize such a field-sequential type liquid crystal display device.

Hence, in order to provide a field-sequential type liquid crystal display device having the above-mentioned excellent advantages or to increase the response speed of a color-filter type liquid crystal display device, the present inventors are engaged in research and development to drive a liquid crystal, such as a ferroelectric liquid crystal, that has spontaneous polarization and can be expected to achieve high response speed, 100 to 1000 times the conventional response speed, using switching elements, such as TFTs (for example, Japanese Patent Application Laid-Open No. 11-119189/1999).

In the ferroelectric liquid crystal having spontaneous polarization, liquid crystal molecules are arranged in nearly parallel with the substrate, and the direction of the long axis of the liquid crystal molecules is changed by voltage application. A liquid crystal panel in which the ferroelectric liquid crystal is sandwiched between two polarization plates, the polarization axes of which are orthogonal to each other, and the intensity of the transmitted light is changed using birefringence caused by the change in the direction of the long axis of the liquid crystal molecules.

In recent years, the request for three-dimensional image display is intensified, and a liquid crystal display device that carries out three-dimensional image display using multiple liquid crystal panels stacked has been proposed (see, for example, M. Date et al., IDW '03 Proceedings of The 10th International Display Workshops, p. 1409, 2003).

DISCLOSURE OF THE INVENTION

In such a liquid crystal display device having the configuration described above, it is important that the desired brightness is obtained at the overlaid portion of the multiple liquid crystal panels, in particular.

In consideration of the circumstances described above, the present invention is intended to provide a liquid crystal display device that carries out image display using multiple liquid crystal panels stacked and can easily obtain the desired brightness.

A liquid crystal display device according to a first aspect is a liquid crystal display device comprising stacked multiple liquid crystal panels in which a liquid crystal material is sealed in gaps formed by multiple substrates, and carrying out image display by controlling the light transmittance of the liquid crystal material through voltage application to the stacked liquid crystal panels, the liquid crystal display device being characterized in that the average change in the direction of the optical axis due to the response of the liquid crystal molecules with respect to the applied voltage is different among the multiple liquid crystal panels.

In the liquid crystal display device according to the first aspect, the average change in the direction of the optical axis due to the response of the liquid crystal molecules with respect to the applied voltage, that is, the change in the direction of the long axis of the liquid crystal molecules with respect to the applied voltage, is different among the stacked multiple liquid crystal panels. Hence, the desired brightness is obtained in a wide range.

A liquid crystal display device according to a second aspect is characterized in that the alignment states of the liquid crystal molecules are nearly parallel with the substrate.

In the liquid crystal display device according to the second aspect, the alignment states of the liquid crystal molecules are nearly parallel with the substrate, whereby the above-mentioned average change in the direction of the optical axis (the change in the direction of the long axis of the liquid crystal molecules) can easily be made different among the multiple liquid crystal panels.

A liquid crystal display device according to a third aspect is characterized in that the multiple liquid crystal panels are stacked while a predetermined distance is provided therebetween.

In the liquid crystal display device according to the third aspect, the multiple liquid crystal panels are stacked while a predetermined distance is provided therebetween. Various three-dimensional feelings can be adjusted by adjusting this distance.

A liquid crystal display device according to a fourth aspect is characterized in that pixel electrodes and a common electrode are formed on the opposed substrates of the multiple liquid crystal panels, and that the positional relationship of the substrate on which the pixel electrodes are formed and the substrate on which the common electrode is formed is different among the multiple liquid crystal panels.

In the liquid crystal display device according to the fourth aspect, the positional relationship of the substrate on which the pixel electrodes are formed and the substrate on which the common electrode is formed is made different among the multiple liquid crystal panels, and the multiple liquid crystal panels are stacked, whereby the above-mentioned average change in the direction of the optical axis (the change in the direction of the long axis of the liquid crystal molecules) is made different among the multiple liquid crystal panels. Hence, the change in the direction can easily be made different.

A liquid crystal display device according to a fifth aspect is characterized in that the direction of the electric field of the voltage applied to the overlaid portion of the multiple liquid crystal panels is different among the multiple liquid crystal panels.

In the liquid crystal display device according to the fifth aspect, the direction of the electric field of the voltage applied to the overlaid portion of the multiple liquid crystal panels is made different, whereby the above-mentioned average change in the direction of the optical axis (the change in the direction of the long axis of the liquid crystal molecules) is made different among the multiple liquid crystal panels. Hence, the change in the direction can easily be made different.

A liquid crystal display device according to a sixth aspect is characterized in that the liquid crystal material is a liquid crystal material having spontaneous polarization.

In the liquid crystal display device according to the sixth aspect, a liquid crystal material having spontaneous polarization is used. Hence, the alignment states of liquid crystal molecules, being parallel with the substrate, can easily be attained. In addition, quick response is made possible, and high moving image display characteristics are obtained; furthermore, display according to the field-sequential system can be carried out.

A liquid crystal display device according to a seventh aspect is characterized in that the liquid crystal material is a ferroelectric liquid crystal material.

In the liquid crystal display device according to the seventh aspect, a ferroelectric liquid crystal material is used. Because a ferroelectric liquid crystal material having a small spontaneous polarization value is used, the display device can be driven using switching elements, such as TFTs.

A liquid crystal display device according to an eighth aspect is characterized in that the liquid crystal material is a nematic liquid crystal material.

In the liquid crystal display device according to the eighth aspect, a nematic liquid crystal material is used. Hence, the alignment states of liquid crystal molecules, being nearly parallel with the substrate, can be attained by carrying out driving according to the IPS (in-plane-switching) system.

A liquid crystal display device according to a ninth aspect is characterized in that color display is carried out according to the field-sequential system.

In the liquid crystal display device according to the ninth aspect, color display is carried out according to the field-sequential system in which the light of multiple colors is switched with the passage of time. Hence, color display having high resolution, high color purity and quick response is made possible.

A liquid crystal display device according to a tenth aspect is characterized in that color display is carried out according to the color-filter system.

In the liquid crystal display device according to the tenth aspect, color display is carried out according to the color-filter system in which color filters are used. Hence, color display can easily be carried out.

BRIEF DESCRIPTION OF THE DRAWINGS

FIG. 4 is a block diagram showing the circuit configuration of a liquid crystal display device according to a first embodiment (field-sequential system);

FIG. 14 is a view showing another example (V-shaped electro-optic response characteristics) of the electro-optic response characteristics of a liquid crystal material; and FIG. 15 is a view showing the drive sequence of the liquid crystal display device according to the third embodiment.

BEST MODES FOR IMPLEMENTING THE INVENTION

Figure 1:
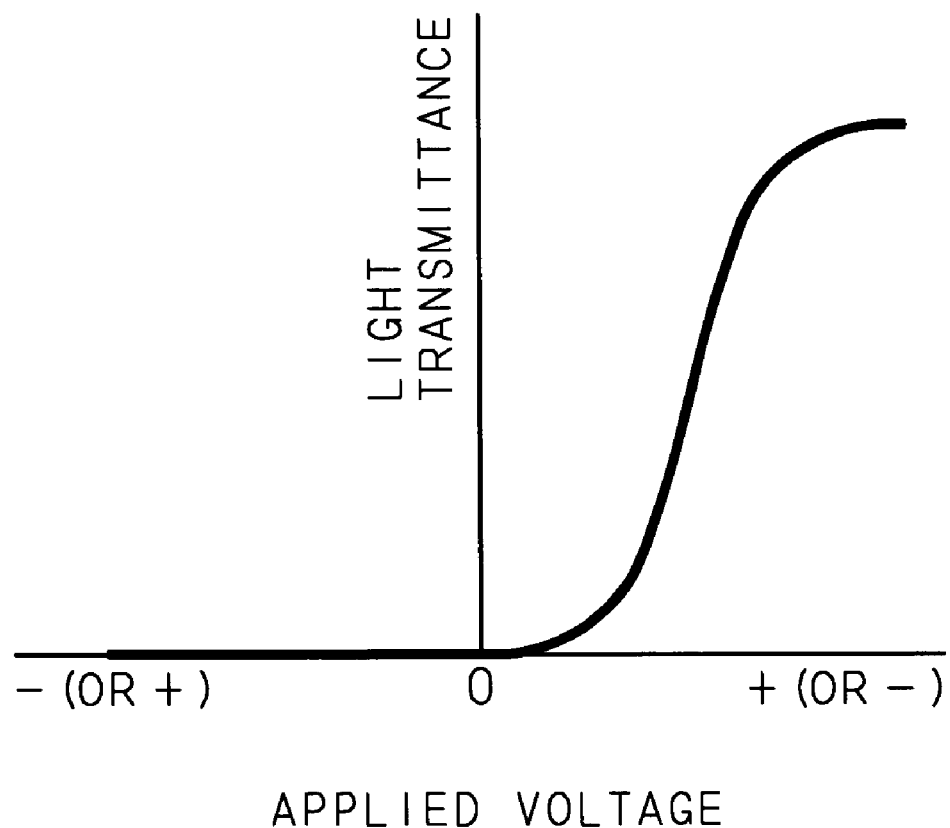
FIG. 1 is a view showing an example (half-V-shaped electro-optic response characteristics) of the electro-optic response characteristics of a liquid crystal material.

The present invention will be described specifically referring to the drawings showing embodiments thereof. However, the present invention is not limited to the following embodiments.

In a field-sequential type liquid crystal display device that uses a ferroelectric liquid crystal, because the attenuation rate of the light transmitting through a liquid crystal panel with respect to the incident light is low, approximately 20%, it is, considered that this type of liquid crystal display device is applicable to a display device that displays three-dimensional images using multiple liquid crystal panels stacked. However, in the case that multiple liquid crystal panels are stacked, the brightness at the overlaid portion of the multiple liquid crystal panels may become low depending on the combination of the brightness levels of the respective liquid crystal panels, and there is a problem of requiring ingenuity to obtain the desired brightness.

This kind of problem of being difficult to obtain the desired brightness and requiring some ingenuity is encountered similarly in the color-filter type liquid crystal display device that uses a ferroelectric liquid crystal, and is also encountered similarly in the IPS-type liquid crystal display device that uses a nematic liquid crystal in which liquid crystal molecules are arranged in nearly parallel with the substrate, as in the case of the ferroelectric liquid crystal.

With the present invention, in a liquid crystal display device comprising stacked multiple liquid crystal panels that use a ferroelectric liquid crystal in which liquid crystal molecules are arranged in nearly parallel with the substrate, or in a liquid crystal display device comprising stacked multiple IPS-type liquid crystal panels that use a nematic liquid crystal in which liquid crystal molecules are arranged in nearly parallel with the substrate, the average change in the direction of the optical axis due to the response of the liquid crystal molecules with respect to the applied voltage, that is, the change in the direction of the long axis of the liquid crystal molecules with respect to the applied voltage, is made different among the stacked multiple liquid crystal panels, whereby the desired brightness can easily be obtained.

The reason why the desired brightness can be attained using the above-mentioned methods of the present invention will be described below.

After a TFT substrate having pixel electrodes (pixel number: 800×600, diagonal size: 4 inches) and a common electrode substrate having a common electrode were washed, they were coated with polyimide and baked for one hour at 200° C. to form polyimide films of approximately 200 Å. Furthermore, these polyimide films were rubbed with a rayon cloth, and an empty panel was produced by stacking the two substrates so that a gap is maintained therebetween using spacers made of silica having an average particle size of 1.6 µm. A monostable ferroelectric liquid crystal material (for example, R2301 produced by Clariant Japan) having such half-V-shaped electro-optic response characteristics as shown in FIG. 1 is sealed in the empty panel. The magnitude of spontaneous polarization of the sealed ferroelectric liquid crystal material was 6 nC/cm$^2$. Furthermore, after the sealing, a DC voltage of 3 V was applied at the transition point from the cholesteric phase to the chiral smectic C phase, whereby a uniform liquid crystal alignment state was attained.

Driver ICs and control circuits capable of carrying out the field-sequential type display were connected to the liquid crystal panels produced. The two liquid crystal panels provided with the driver ICs and the control circuits described above were stacked, the stack was sandwiched between a pair of polarization plates being in the crossed nicols state, and this was combined with an LED (Laser Emitting Diode) backlight capable of red/green/blue light emission according to the time division system. The pair of polarization plates in the crossed nicols state was adjusted so that black image was displayed when a black image signal was sent to the two liquid crystal panels and when the optical axes of the two liquid crystal panels were aligned.

Figure 2A:
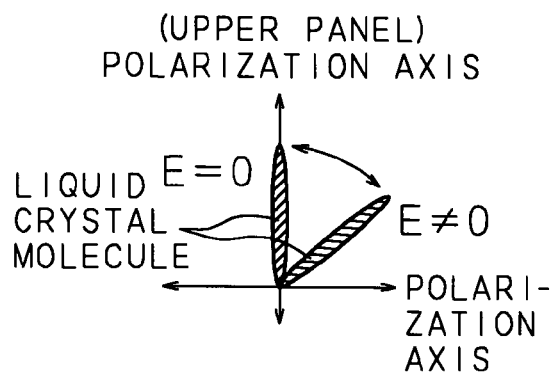
FIG. 2A is a view showing the rotation direction of the long axis of the liquid crystal molecule in a liquid crystal panel.
Figure 2B:
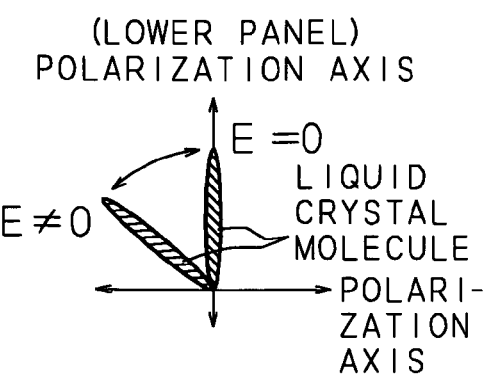
FIG. 2B is a view showing the rotation direction of the long axis of the liquid crystal molecule in another liquid crystal panel.

Then, a voltage E was applied so that the transmission light intensities of the two upper and lower liquid crystal panels become 0%, 20%, 40%, 60%, 80% and 100% of the maximum, and the transmission light intensities at the overlaid portions in the respective combinations of transmission light intensities were measured. At this time, the transmission light intensities were measured in the case that the change in the direction of the long axis of the liquid crystal molecules with respect to the applied voltage E, that is, the average change in the direction of the optical axis, obtained from the alignment state of the liquid crystal molecules, is different between the upper and lower liquid crystal panels as shown in FIGS. 2A and 2B, and in the case that the change in the direction of the long axis of the liquid crystal molecules with respect to the applied voltage E, that is, the average change in the direction of the optical axis, obtained from the alignment state of the liquid crystal molecules, is the same between the upper and lower liquid crystal panels as shown in FIGS. 3A and 3B. The measurement results of the transmission light intensities in the former case are shown in FIG. 2C, and the measurement results of the transmission light intensities in the latter case are shown in FIG. 3C.

Figure 2C:
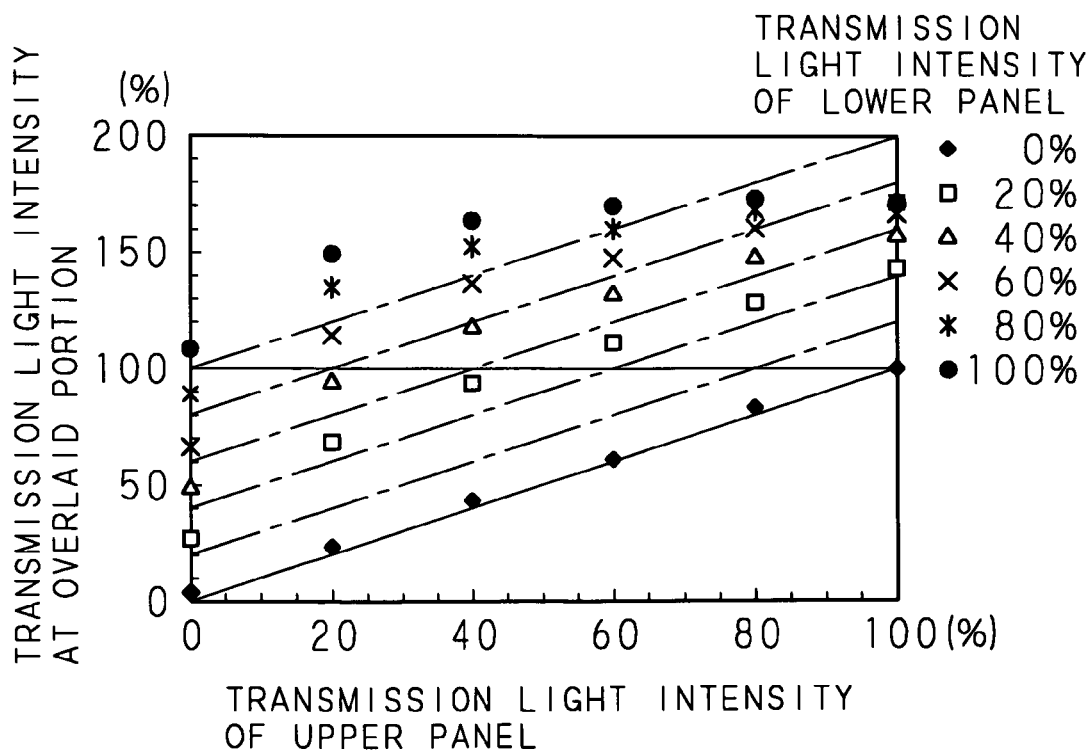
FIG. 2C is a graph showing the transmission light intensities at the overlaid portion in the case that the rotation direction of the long axis of the liquid crystal molecule is different between the two liquid crystal panels.
Figure 3A:
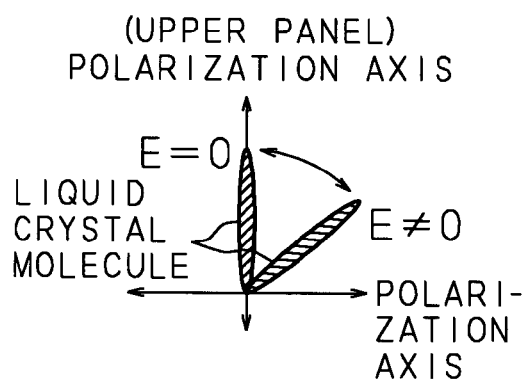
FIGS. 3A and 3B are views showing the rotation direction of the long axis of the liquid crystal molecule in liquid crystal panels.
Figure 3B:
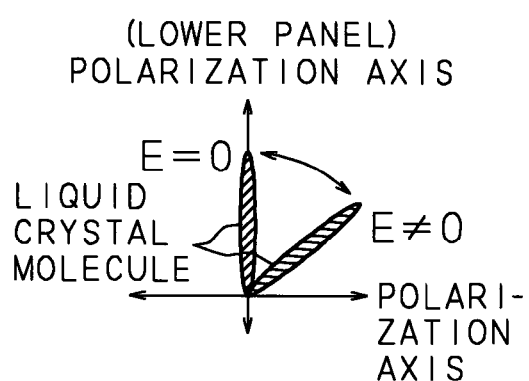

In the case that the average change in the direction of the optical axis with respect to the applied voltage is different, as shown in FIG. 2C, the transmission light intensity at the overlaid portion is not necessarily equal to the sum of the transmission light intensities of the two liquid crystal panels; however, a wide range of transmission light intensity is obtained at the overlaid portions. For this reason, the desired intermediate transmission light intensity can be attained by adjusting the transmission light intensity of each liquid crystal panel.

Figure 3C:
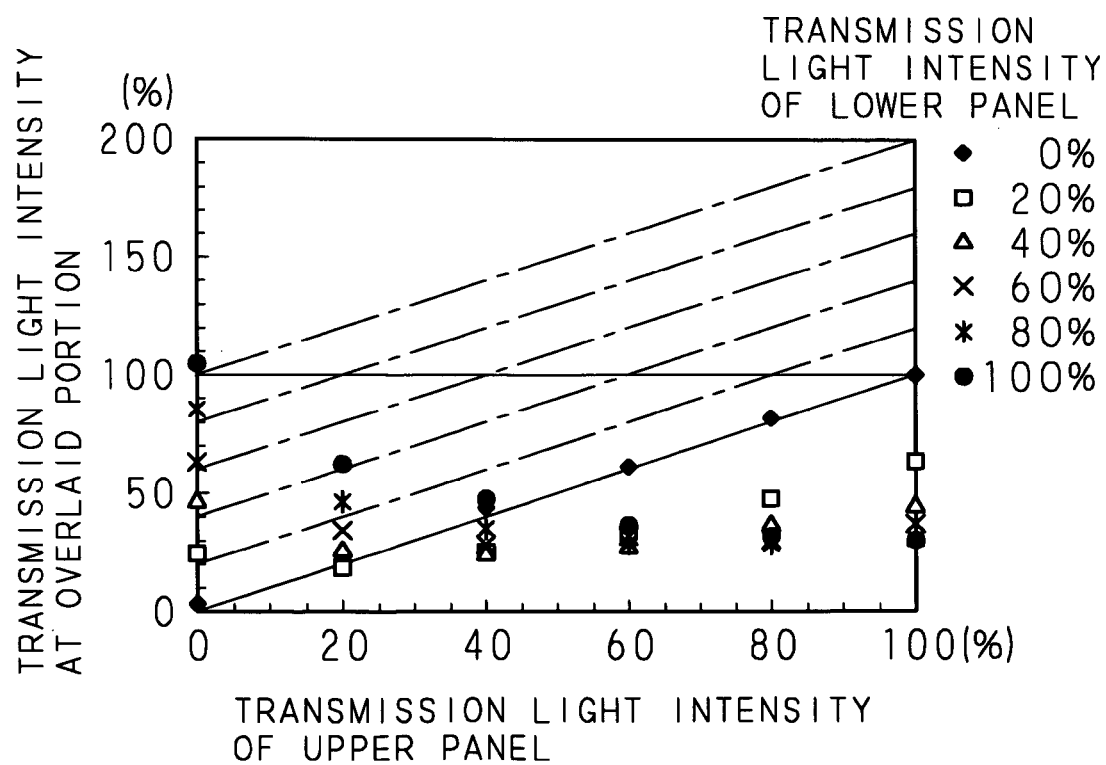
FIG. 3C is a graph showing the transmission light intensities at the overlaid portion in the case that the rotation direction of the long axis of the liquid crystal molecule is the same between the two liquid crystal panels.

On the other hand, in the case that the average change in the direction of the optical axis with respect to the applied voltage is the same, as shown in FIG. 3C, the addition effect of the transmission light intensities is obtained only when the transmission light intensity of either one of the liquid crystal panels is 0% (black image), and only a narrow range of transmission light intensity is obtained at the overlaid portion. For this reason, it is difficult to obtain an intermediate transmission light intensity.

According to the measurement results described above, it is understood that the desired brightness can easily be obtained in the present invention by making the average change in the direction of the optical axis due to the response of the liquid crystal molecules with respect to the applied voltage, that is, the change in the direction of the long axis of the liquid crystal molecules different between the stacked liquid crystal panels.

First Embodiment

Figure 5:
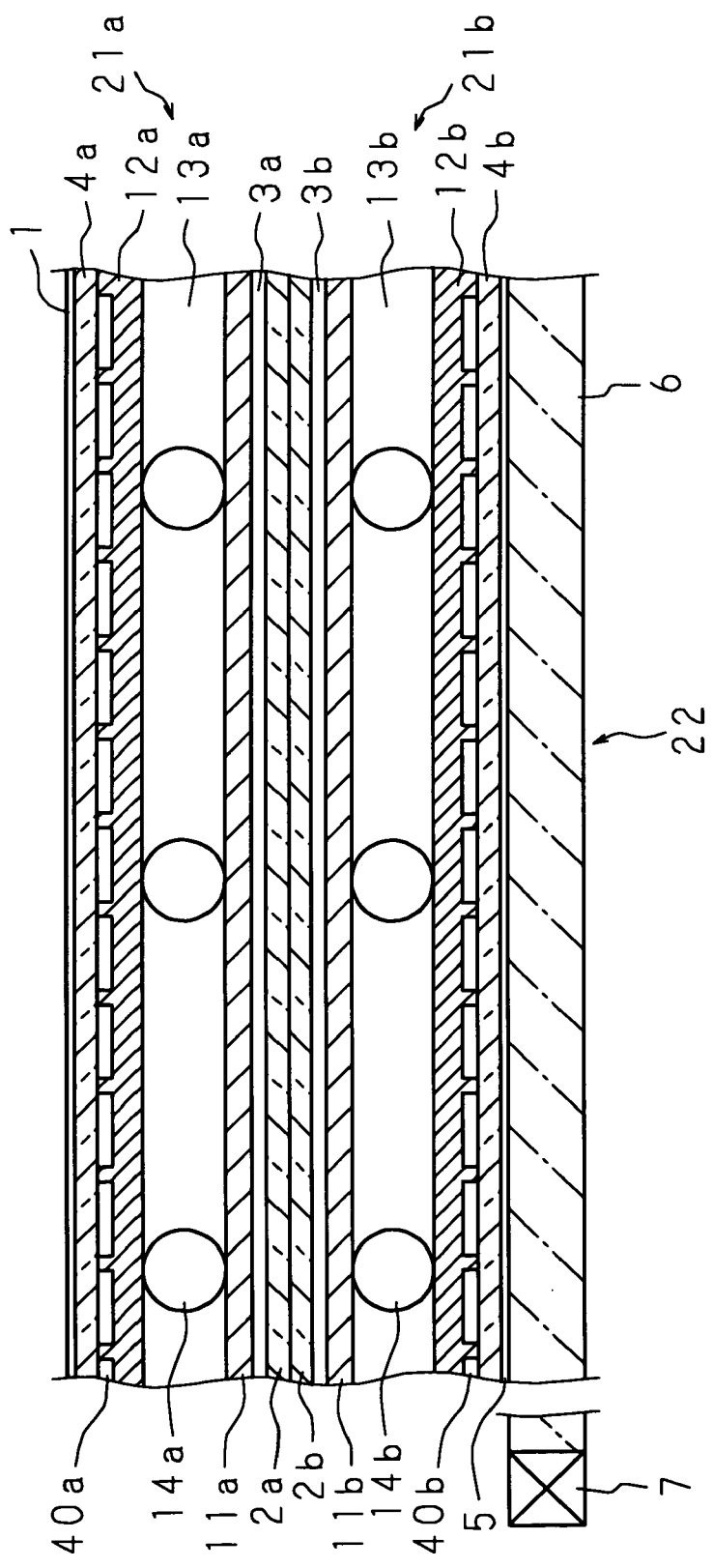
FIG. 5 is a schematic sectional view showing the liquid crystal panels and the backlight of the liquid crystal display device according to the first embodiment.
Figure 6:
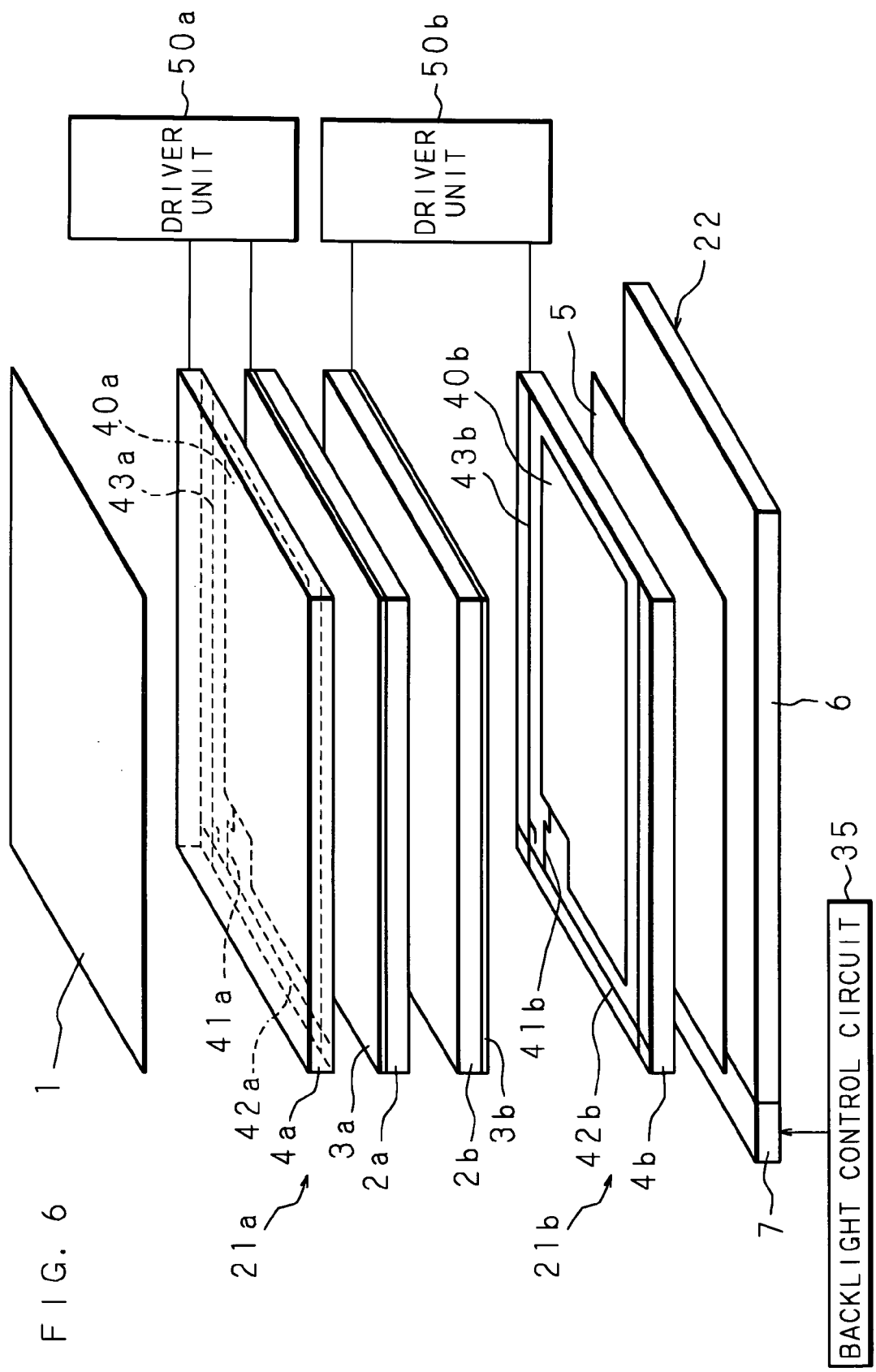
FIG. 6 is a schematic view showing a configuration example of the whole of the liquid crystal display device according to the first embodiment.

FIG. 4 is a block diagram showing the circuit configuration of a liquid crystal display device according to a first embodiment of the present invention, FIG. 5 is a schematic sectional view showing the liquid crystal panels and the backlight thereof, and FIG. 6 is a schematic view showing a configuration example of the whole of the liquid crystal display device. The first embodiment is a liquid crystal display device that carries out color display according to the field-sequential system.

In FIG. 4, numerals 21a and 21b designate two liquid crystal panels, the configurations of which are shown in FIGS. 5 and 6, and numeral 22 designates a backlight, the configuration of which is shown in FIGS. 5 and 6.

The liquid crystal panel 21a on the upper (front face) side comprises a glass substrate 4a, a common electrode 3a and a glass substrate 2a, which are stacked in this order from the upper layer (front face) side to the lower layer (rear face) side, and pixel electrodes 40a, 40a, . . . are formed so as to be arranged in a matrix form on the common electrode 3a side of the glass substrate 4a. An alignment film 12a is disposed on the lower faces of the pixel electrodes 40a, 40a, . . . located beneath the glass substrate 4a, an alignment film 11a is disposed on the upper face of the common electrode 3a, and the space between these alignment films 11a and 12a is filled with a liquid crystal material to form a liquid crystal layer 13a. Numeral 14a designates spacers for maintaining the layer thickness of the liquid crystal layer 13a.

The liquid crystal panel 21b on the lower (rear face) side comprises a glass substrate 2b, a common electrode 3b and a glass substrate 4b, which are stacked in this order from the upper layer (front face) side to the lower layer (rear face) side, and pixel electrodes 40b, 40b, . . . are formed so as to be arranged in a matrix form on the common electrode 3b side of the glass substrate 4b. An alignment film 12b is disposed on the upper faces of the pixel electrodes 40b, 40b, . . . located on the glass substrate 4b, an alignment film 11b is disposed on the upper face of the common electrode 3b, and the space between these alignment films 11b and 12b is filled with a liquid crystal material to form a liquid crystal layer 13b. Numeral 14b designates spacers for maintaining the layer thickness of the liquid crystal layer 13b.

The two liquid crystal panels 21a and 21b configured as described above and closely stacked are sandwiched between a pair of polarization plates 1 and 5.

As described above, the upper/lower relationship of the common electrode and the pixel electrodes is reversed between the two liquid crystal panels 21a and 21b according to the first embodiment. With this electrode configuration, the average change in the direction of the optical axis, obtained from the alignment state of the liquid crystal molecules with respect to the applied voltage, that is, the change in the direction of the long axis of the liquid crystal molecules with respect to the applied voltage, is different between the two liquid crystal panels 21a and 21b according to the first embodiment.

A driver unit 50a comprising a data driver 32a and a scan driver 33a is connected between the common electrode 3a and the pixel electrodes 40a, 40a, . . . . The data driver 32a is connected to TFTs 41a via signal lines 42a, and the scan driver 33a is connected to the TFTs 41a via scanning lines 43a. The TFTs 41a are ON/OFF controlled using the scan driver 33a. Furthermore, each of the pixel electrodes 40a, 40a, . . . is connected to the TFT 41a. Hence, the transmission light intensity of each pixel of the liquid crystal panel 21a on the upper (front face) side is controlled by a signal supplied from the data driver 32a via the signal line 42a and the TFT 41a. Similarly, a driver unit 50b comprising a data driver 32b and a scan driver 33b is connected between the common electrode 3b and the pixel electrodes 40b, 40b, . . . . The data driver 32b is connected to TFTs 41b via signal lines 42b, and the scan driver 33b is connected to the TFTs 41b via scanning lines 43b. The TFTs 41b are ON/OFF controlled using the scan driver 33b. Furthermore, each of the pixel electrodes 40b, 40b, . . . is connected to the TFT 41b. Hence, the transmission light intensity of each pixel of the liquid crystal panel 21b on the lower (rear face) side is controlled by a signal supplied from the data driver 32b via the signal line 42b and the TFT 41b.

The backlight 22 is disposed on the lower layer (rear face) side of the liquid crystal panel 21b, and is provided with an LED array 7 disposed so as to face an end face of a light guiding/diffusing plate 6 that forms a light-emitting area. This LED array 7 comprises one or multiple LEDs, one LED chip being formed of LED elements that emit three primary colors, namely, red, green and blue, to the face opposed to the light guiding/diffusing plate 6. In red, green and blue subframes, the red, green and blue LED elements are turned ON, respectively. The light guiding/diffusing plate 6 guides the light emitted from each LED of the LED array 7 to its entire surface, and diffuses the light to the upper face, thereby functioning as the light-emitting area.

The two liquid crystal panels 21a and 21b and the backlight 22 capable of emitting red, green and blue light according to the time division system are stacked. The lighting timing and the emission color of the backlight 22 are controlled in synchronization with data scanning across the liquid crystal panels 21a and 21b on the basis of display data.

In FIG. 4, numeral 31 designates a control signal generating circuit 31, to which a synchronous signal SYN is inputted from a personal computer, and which generates various control signals CS necessary for display. Pixel data PDa for carrying out display on the liquid crystal panel 21a and pixel data PDb for carrying out display on the liquid crystal panel 21b are outputted from image memory units 30a and 30b to the data drivers 32a and 32b. On the basis of the pixel data PDa and PDb and the control signals CS for changing the polarities of applied voltages, voltages are applied to the liquid crystal panels 21a and 21b via the data drivers 32a and 32b.

In addition, the control signals CS are respectively outputted from the control signal generating circuit 31 to a reference voltage generating circuit 34, the data drivers 32a and 32b, the scan drivers 33a and 33b, and a backlight control circuit 35. The reference voltage generating circuit 34 generates reference voltages VR1a, VR1b, VR2a and VR2b, and outputs the generated reference voltage VR1a to the data driver 32a, the reference voltage VR1b to the data driver 32b, the reference voltage VR2a to the scan driver 33a, and the reference voltage VR2b to the scan driver 33b, respectively. On the basis of the pixel data PDa and PDb from the image memory units 30a and 30b, and the control signals CS from the control signal generating circuit 31, the data driver 32a and 32b output signals to the signal lines 42a and 42b of the pixel electrodes 40a and 40b. In synchronization with the output of the signals, the scan drivers 33a and 33b sequentially scan the scanning lines 43a and 43b of the pixel electrodes 40a and 40b, line by line. Furthermore, the backlight control circuit 35 applies drive voltages to the backlight 22, whereby the backlight 22 emits red light, green light and blue light.

Next, the operation of the liquid crystal display device will be described. The pixel data PDa and PDb for carrying out display are inputted from the personal computer to the image memory units 30a and 30b, and the image memory units 30a and 30b store the pixel data PDa and PDb once and output the pixel data PDa and PDb upon receipt of the control signals CS outputted from the control signal generating circuit 31. The control signals CS generated by the control signal generating circuit 31 are supplied to the data drivers 32a and 32b, the scan drivers 33a and 33b, the reference voltage generating circuit 34, and the backlight control circuit 35.

Upon receipt of the control signals CS, the data drivers 32a and 32b output signals to the signal lines 42a and 42b of the pixel electrodes 40a and 40b on the basis of the pixel data PDa and PDb outputted from the image memory units 30a and 30b. Upon receipt of the control signals CS, the scan drivers 33a and 33b sequentially scan the scanning lines 43a and 43b of the pixel electrodes 40a and 40b, line by line. According to the signals outputted from the data drivers 32a and 32b and the scanning using the scan drivers 33a and 33b, the TFTs 41a and 41b are driven, and voltages are applied to the pixel electrodes 40a and 40b, whereby the transmission light intensities of the pixels are controlled. Upon receipt of the control signals CS, the backlight control circuit 35 applies drive voltages to the backlight 22 and causes the red, green and blue LED elements included in the LED array 7 of the backlight 22 to emit light according to the time division system, whereby red light, green light and blue light are emitted sequentially with the passage of time. In this way, color display is carried out by synchronizing the lighting control of the backlight 22 (the LED array 7) that emits light incident on the liquid crystal panels 21a and 21b with multiple times of data scanning across the liquid crystal panels 21a and 21b.

A specific example of the liquid crystal display device according to the first embodiment will be described. After a TFT substrate having the pixel electrodes 40a, 40a, ... (40b, 40b, ... ) (pixel number: 800×600, diagonal size: 4 inches) and the glass substrate 2a (2b) having the common electrode 3a (3b) were washed, they were coated with polyimide and baked for one hour at 200° C. to form polyimide films of approximately 200 Å as the alignment films 11a and 12a (11b and 12b). Furthermore, these alignment films were rubbed with a rayon cloth, and an empty panel was produced by stacking the two substrates so that a gap was maintained therebetween using the spacers 14a (14b) made of silica having an average particle size of 1.6 µm. A monostable ferroelectric liquid crystal material (R2301 produced by Clariant Japan) having such half-V-shaped electro-optic response characteristics as shown in FIG. 1 was sealed between the alignment films 11a and 12a (11b and 12b) of the empty panel to form the liquid crystal layer 13a (13b). The magnitude of spontaneous polarization of the sealed ferroelectric liquid crystal material was 6 nC/cm$^2$. Furthermore, after the sealing, a DC voltage of 3 V was applied at the transition point from the cholesteric phase to the chiral smectic C phase, whereby a uniform liquid crystal alignment state was attained (alignment processing).

The driver ICs and the control circuits capable of carrying out the field-sequential type display, shown in FIG. 4, were connected to the liquid crystal panel 21a (21b) produced. The two liquid crystal panels 21a and 21b provided with the driver ICs and the control circuits described above were closely attached and stacked, the stack was sandwiched between the pair of polarization plates 1 and 5 being in the crossed nicols state, and this was further stacked with the backlight 22 in which the LED array 7 capable of carrying out red/green/blue monochromatic surface-emitting switching is used as a light source. Because the two liquid crystal panels 21a and 21b were closely attached, the distance between the display areas is equal to the thickness of the two glass substrates (0.7×2=1.4 mm).

The pair of polarization plates 1 and 5 in the crossed nicols state was adjusted so that black image was displayed when a black image signal was sent to the two liquid crystal panels 21a and 21b and when the optical axes of the two liquid crystal panels 21a and 21b were aligned. In addition, the two liquid crystal panels 21a and 21b were disposed so that the average change in the direction of the optical axis, obtained from the alignment state of the liquid crystal molecules with respect to the applied voltage, that is, the change in the direction of the long axis of the liquid crystal molecules with respect to the applied voltage, is different between the two liquid crystal panels 21a and 21b.

Then, three-dimensional image display was carried out using the two liquid crystal panels 21a and 21b. In the case that the display on the liquid crystal panel 21a was superimposed on the display on the liquid crystal panel 21b, for the purpose of obtaining a three-dimensional feeling, the image of an object located at a long distance was displayed on the liquid crystal panel 21b on the lower (rear face) side, the image of an object located at a short distance was displayed on the liquid crystal panel 21a on the upper (front face) side, and the image of an object located at an intermediate distance was displayed in a state in which the brightness levels of the two liquid crystal panels 21a and 21b were adjusted to provide a feeling of depth.

Figure 7:
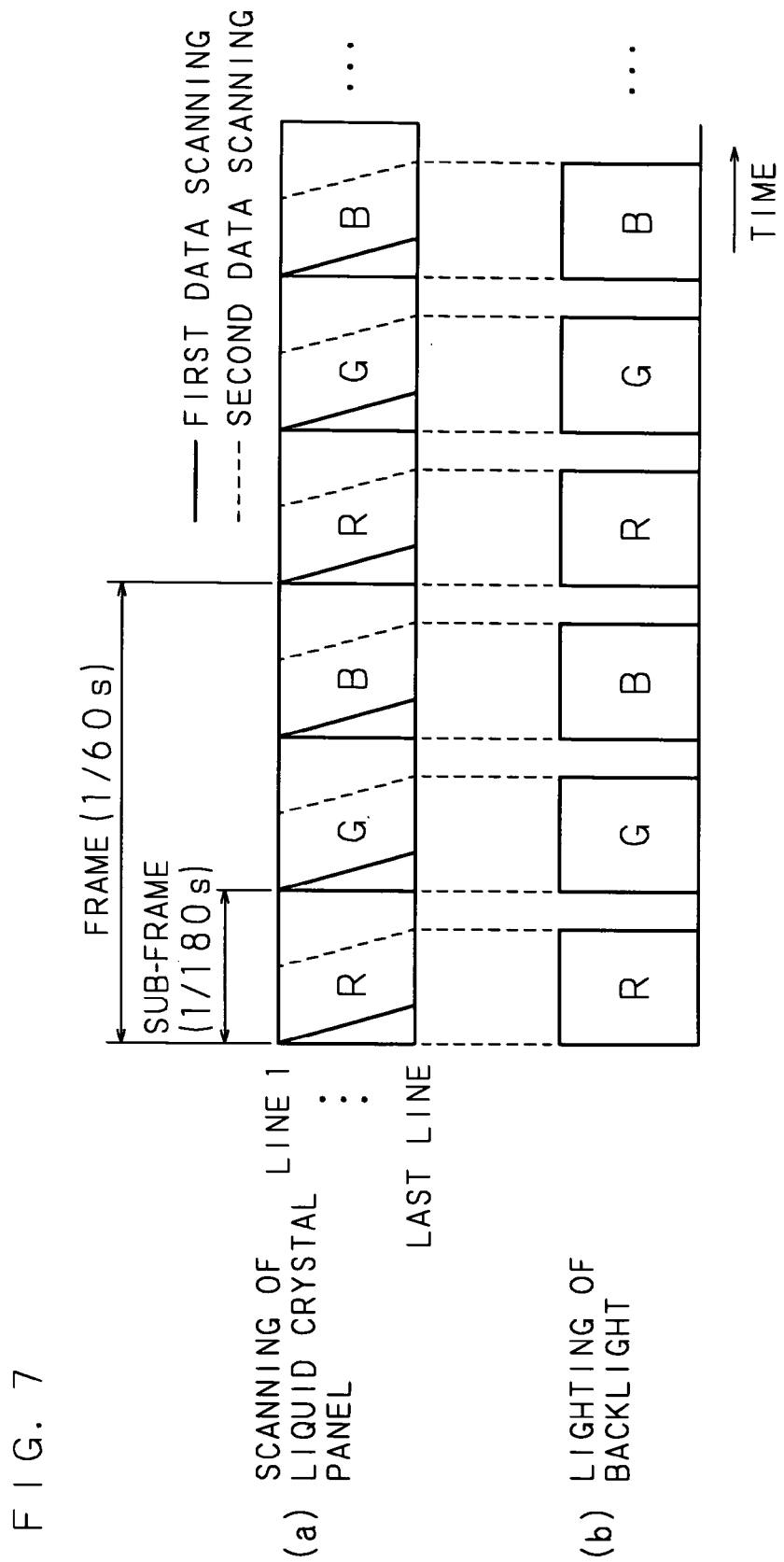
FIG. 7 is a view showing the drive sequence of the liquid crystal display device according to the first embodiment.

At this time, color display according to the field-sequential system was carried out according to such a drive sequence as shown in FIG. 7. FIG. 7(a) shows the timing of line scanning across the liquid crystal panels 21a and 21b, and FIG. 7(b) shows the timing of red/green/blue lighting of the backlight 22. One frame is divided into three sub-frames, and, for example, red light is emitted in a first sub-frame, green light is emitted in a second sub-frame, and blue light is emitted in a third sub-frame, as shown in FIG. 7(b). On the other hand, as shown in FIG. 7(a), scanning for writing image data is carried out twice in each of the red/green/blue sub-frames across the liquid crystal panels 21a and 21b. The first scanning for writing data is carried out by applying a voltage having the polarity capable of attaining bright display, and the second scanning for writing data is carried out by applying a voltage having the polarity opposite to that of the first scanning for writing data and having a value substantially equal to that for the first scanning for writing data. Hence, display darker than that at the time of the first scanning for writing data is attained, and this display is substantially considered as "black image."

As a result, high-resolution image display being excellent in the purity of display colors and having a fully three-dimensional feeling can be attained.

Second Embodiment

Figure 8:
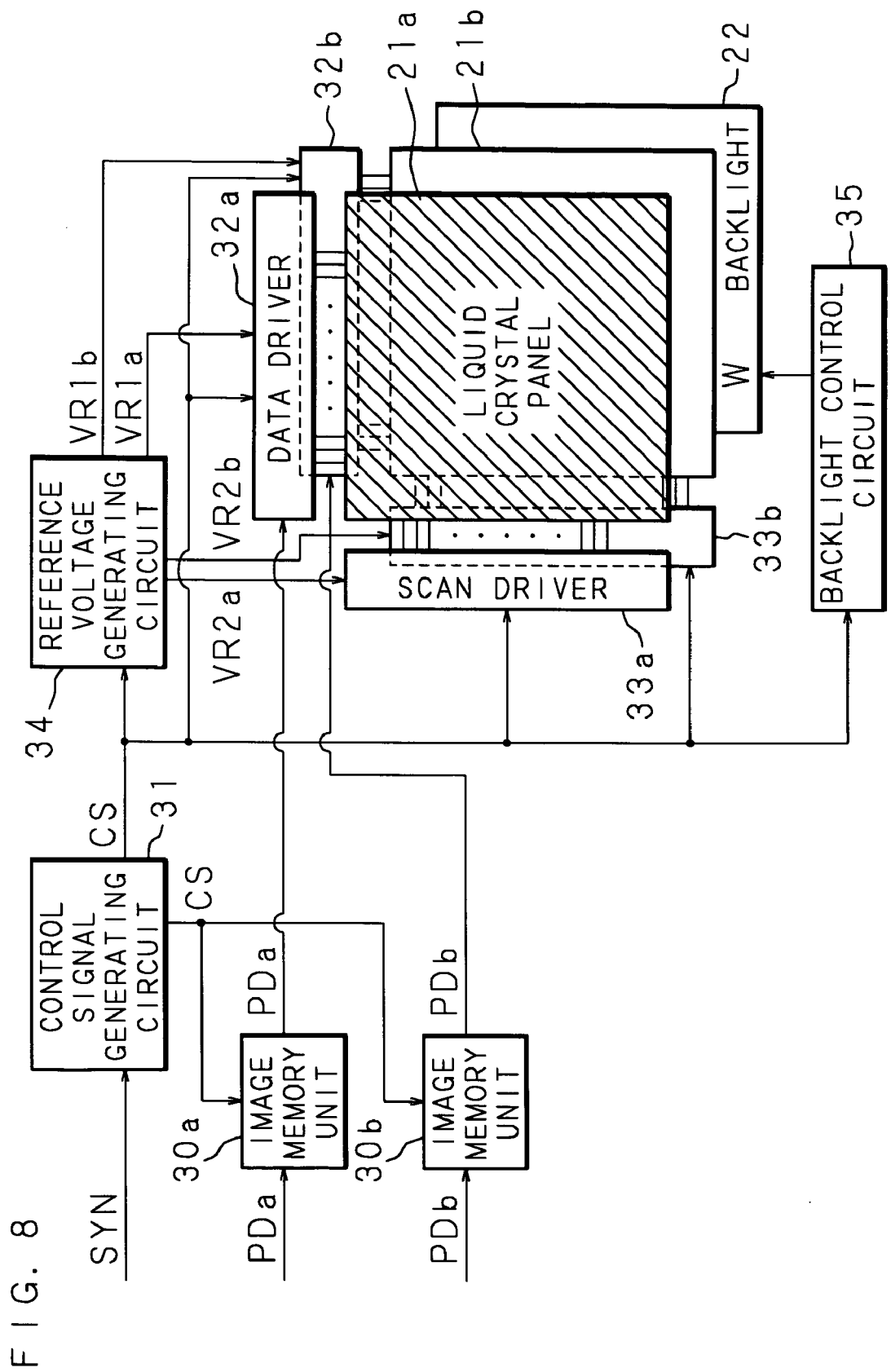
FIG. 8 is a block diagram showing the circuit configuration of a liquid crystal display device according to a second embodiment (color-filter system)
Figure 9:
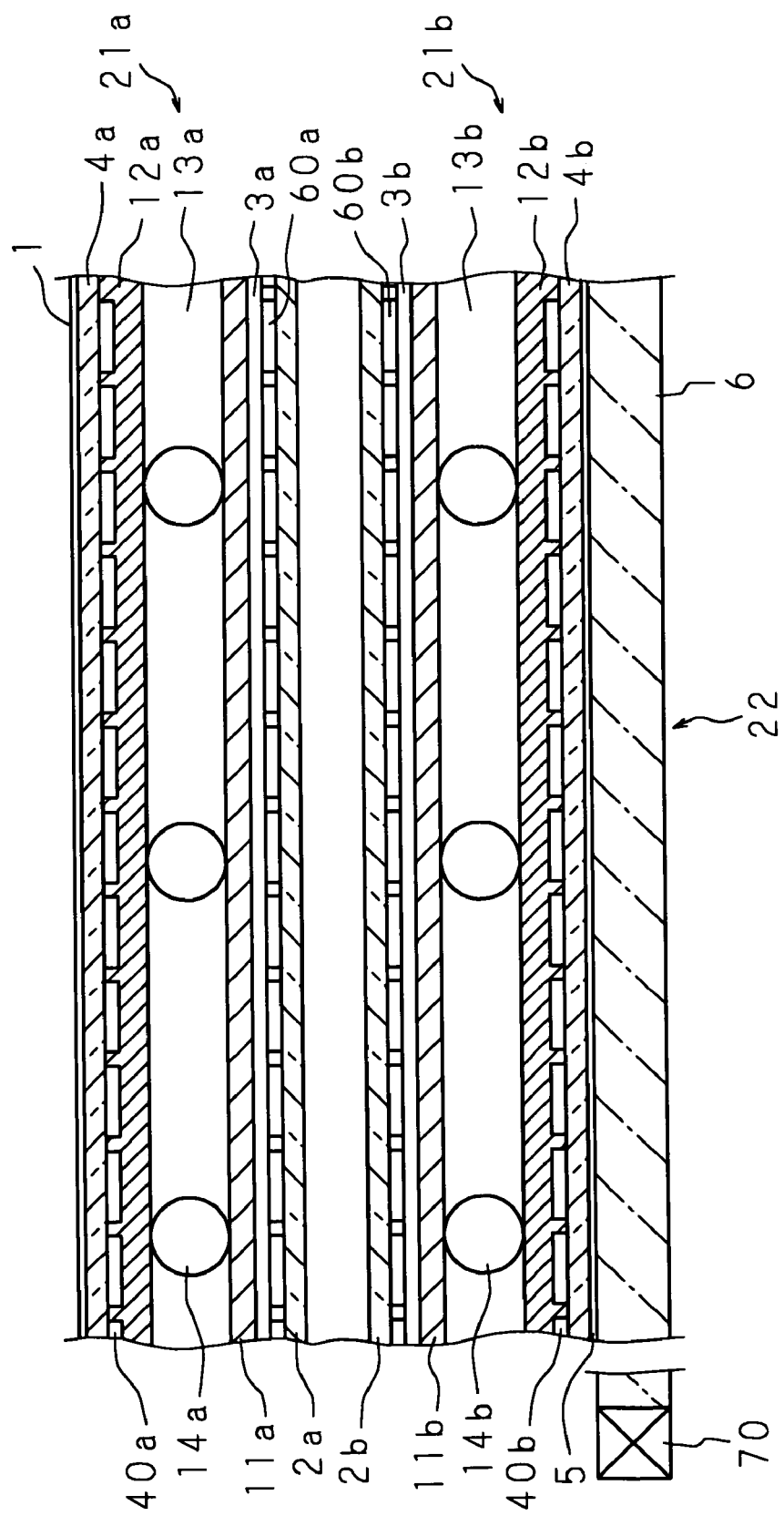
FIG. 9 is a schematic sectional view showing the liquid crystal panels and the backlight of the liquid crystal display device according to the second embodiment.
Figure 10:
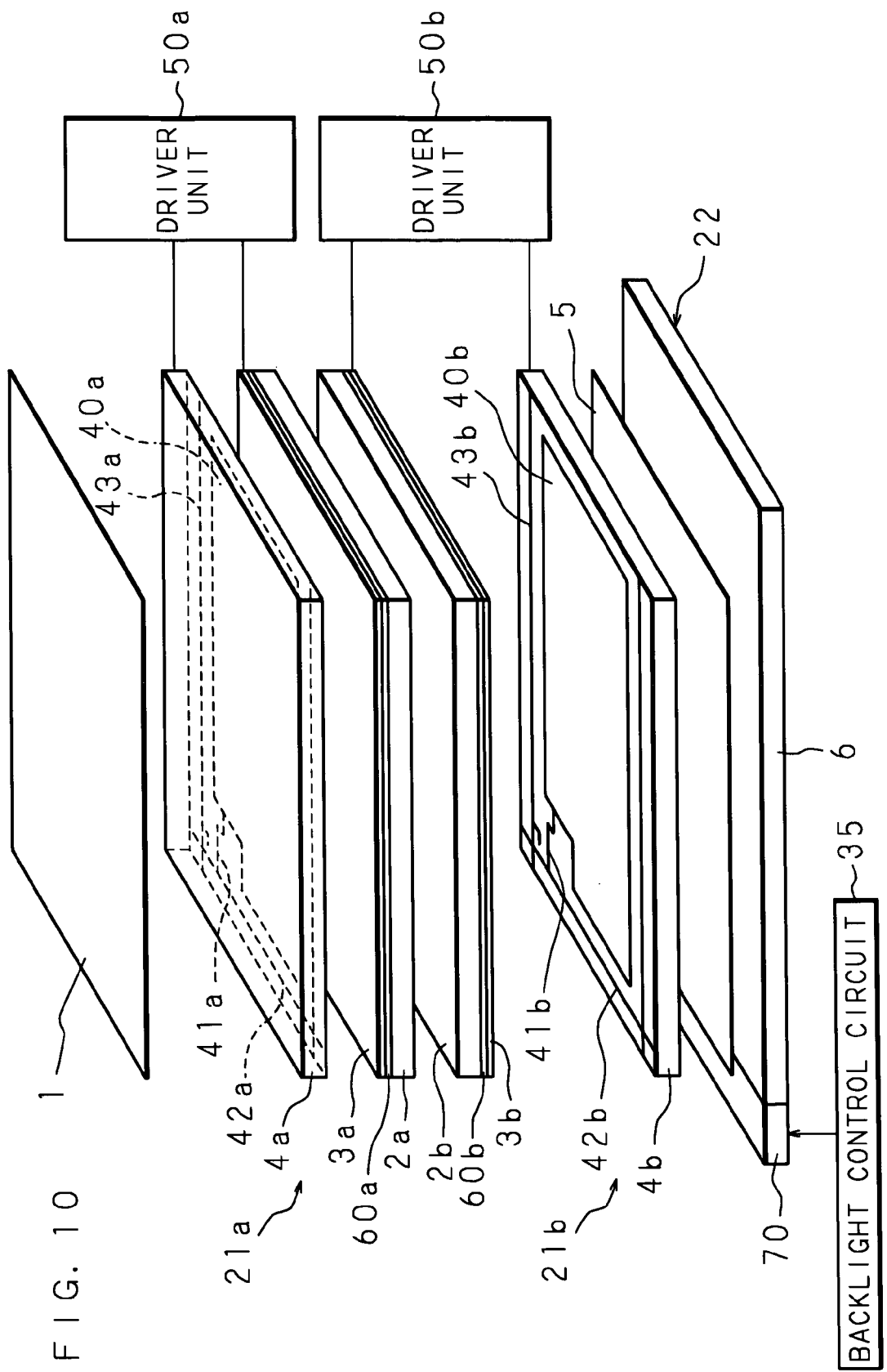
FIG. 10 is a schematic view showing a configuration example of the whole of the liquid crystal display device according to the second embodiment.

FIG. 8 is a block diagram showing the circuit configuration of a liquid crystal display device according to a second embodiment of the present invention, FIG. 9 is a schematic sectional view showing the liquid crystal panels and the backlight thereof, and FIG. 10 is a schematic view showing a configuration example of the whole of the liquid crystal display device. The second embodiment is a liquid crystal display device that carries out color display according to the color-filter system. In FIGS. 8 to 10, the components identical or similar to those shown in FIGS. 4 to 6 are designated by the same numerals.

The common electrodes 3a and 3b are provided with color filters 60a, 60a, . . . and 60b, 60b, . . . for the three primary colors. In addition, the backlight 22 comprises a white light source 70 that is provided with one or multiple white light source elements emitting white light, and a light guiding/diffusing plate 6. In this color-filter type liquid crystal display device, color display is carried out by selectively transmitting white light from the white light source 70 capable of emitting white light according to the time division system, using the color filters 60a and 60b for multiple colors. The liquid crystal panels 21a and 21b are stacked while a predetermined distance is provided therebetween.

The upper/lower relationship of the common electrode and the pixel electrodes is reversed between the two liquid crystal panels 21a and 21b according to the second embodiment as in the case of the first embodiment, whereby the average change in the direction of the optical axis, obtained from the alignment state of the liquid crystal molecules with respect to the applied voltage, that is, the change in the direction of the long axis of the liquid crystal molecules with respect to the applied voltage, is different.

A specific example of the liquid crystal display device according to the second embodiment will be described. After a TFT substrate having the pixel electrodes, 40a, 40a, . . . (40b, 40b, . . . ) (pixel number: 320×3 (RGB)×240, diagonal size: 4 inches) and the glass substrate 2a (2b) having the common electrode 3a (3b) and the RGB color filters 60a, 60a, . . . (60b, 60b, . . . ) were washed, they were coated with polyimide and baked for one hour at 200° C. to form polyimide films of approximately 200 Å as the alignment films 11a and 12a (11b and 12b). Furthermore, these alignment films were rubbed with a rayon cloth, and an empty panel was produced by stacking the two substrates so that a gap is maintained therebetween using the spacers 14a (14b) made of silica having an average particle size of 1.6 µm. A bistable ferroelectric liquid crystal material primarily consisting of a naphthalene-based liquid crystal (for example, the material disclosed by A. Mochizuki et. al. in Ferroelectrics, 133,353 (1991)) having such half-V-shaped electro-optic response characteristics as shown in FIG. 1 was sealed between the alignment films 11a and 12a (11b and 12b) of the empty panel to form the liquid crystal layer 13a (13b). The magnitude of spontaneous polarization of the sealed ferroelectric liquid crystal material was 10 nC/cm$^2$.

The driver ICs and the control circuits capable of carrying out the color-filter type display, shown in FIG. 8, were connected to the liquid crystal panel 21a (21b) produced. The two liquid crystal panels 21a and 21b provided with the driver ICs and the control circuits described above were stacked while a clearance of 2 mm is provided therebetween, the stack was sandwiched between the pair of polarization plates 1 and 5 being in the crossed nicols state, and this was further stacked with the backlight 22 having the white light source 70.

In this example, because the two liquid crystal panels 21a and 21b are stacked while a clearance of 2 mm is provided therebetween, the distance between the display areas, 3.4 mm, is obtained by adding the thickness of the two glass substrates (0.7×2=1.4 mm) to the value of the clearance. By the adjustment of the distance between the display areas by appropriately setting the clearance distance between the liquid crystal panels 21a and 21b, various feelings of depth can be provided.

The pair of polarization plates 1 and 5 in the crossed nicols state was adjusted so that black image was displayed when a black image signal was sent to the two liquid crystal panels 21a and 21b and when the optical axes of the two liquid crystal panels 21a and 21b were aligned. In addition, the two liquid crystal panels 21a and 21b were disposed so that the average change in the direction of the optical axis, obtained from the alignment state of the liquid crystal molecules with respect to the applied voltage, that is, the change in the direction of the long axis of the liquid crystal molecules with respect to the applied voltage, is different between the two liquid crystal panels 21a and 21b.

Then, three-dimensional image display was carried out using the two liquid crystal panels 21a and 21b. In the case that the display on the liquid crystal panel 21a was superimposed on the display on the liquid crystal panel 21b, for the purpose of obtaining a three-dimensional feeling, the image of an object located at a long distance was displayed on the liquid crystal panel 21b on the lower (rear face) side, the image of an object located at a short distance was displayed on the liquid crystal panel 21a on the upper (front face) side, and the image of an object located at an intermediate distance was displayed in a state in which the brightness levels of the two liquid crystal panels 21a and 21b were adjusted to provide a feeling of depth.

Figure 11:
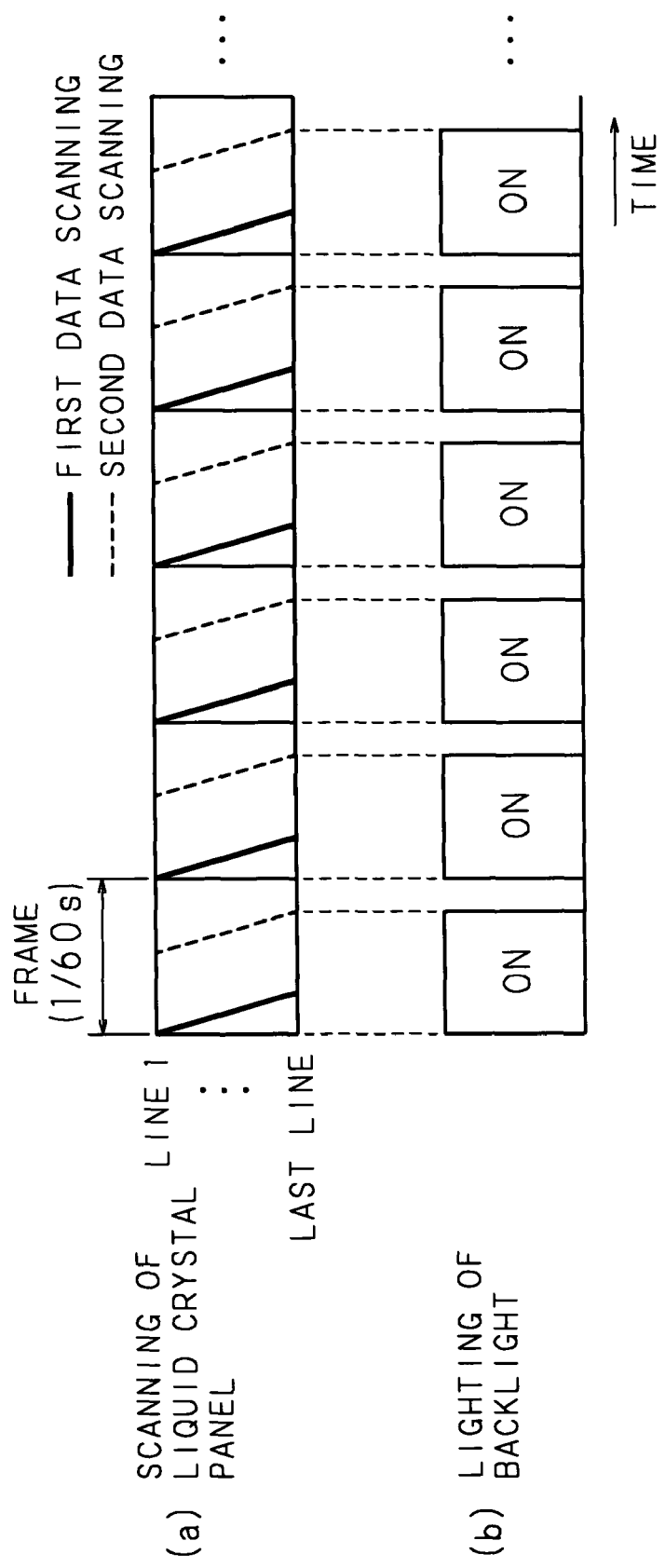
FIG. 11 is a view showing the drive sequence of the liquid crystal display device according to the second embodiment.

At this time, color display according to the color-filter system was carried out according to such a drive sequence as shown in FIG. 11. FIG. 11(a) shows the timing of line scanning across the liquid crystal panels 21a and 21b, and FIG. 11(b) shows the lighting timing of the backlight 22. As shown in FIG. 11(a), scanning for writing image data is carried out twice in each frame across the liquid crystal panels 21a and 21b. The first scanning for writing data is carried out by applying a voltage having the polarity capable of attaining bright display, and the second scanning for writing data is carried out by applying a voltage having the polarity opposite to that of the first scanning for writing data and having a value substantially equal to that for the first scanning for writing data. Hence, display darker than that at the time of the first scanning for writing data is attained, and this display is substantially considered as "black image."

As a result, high-resolution image display being excellent in the purity of display colors and having a fully three-dimensional feeling can be attained.

Third Embodiment

Figure 12:
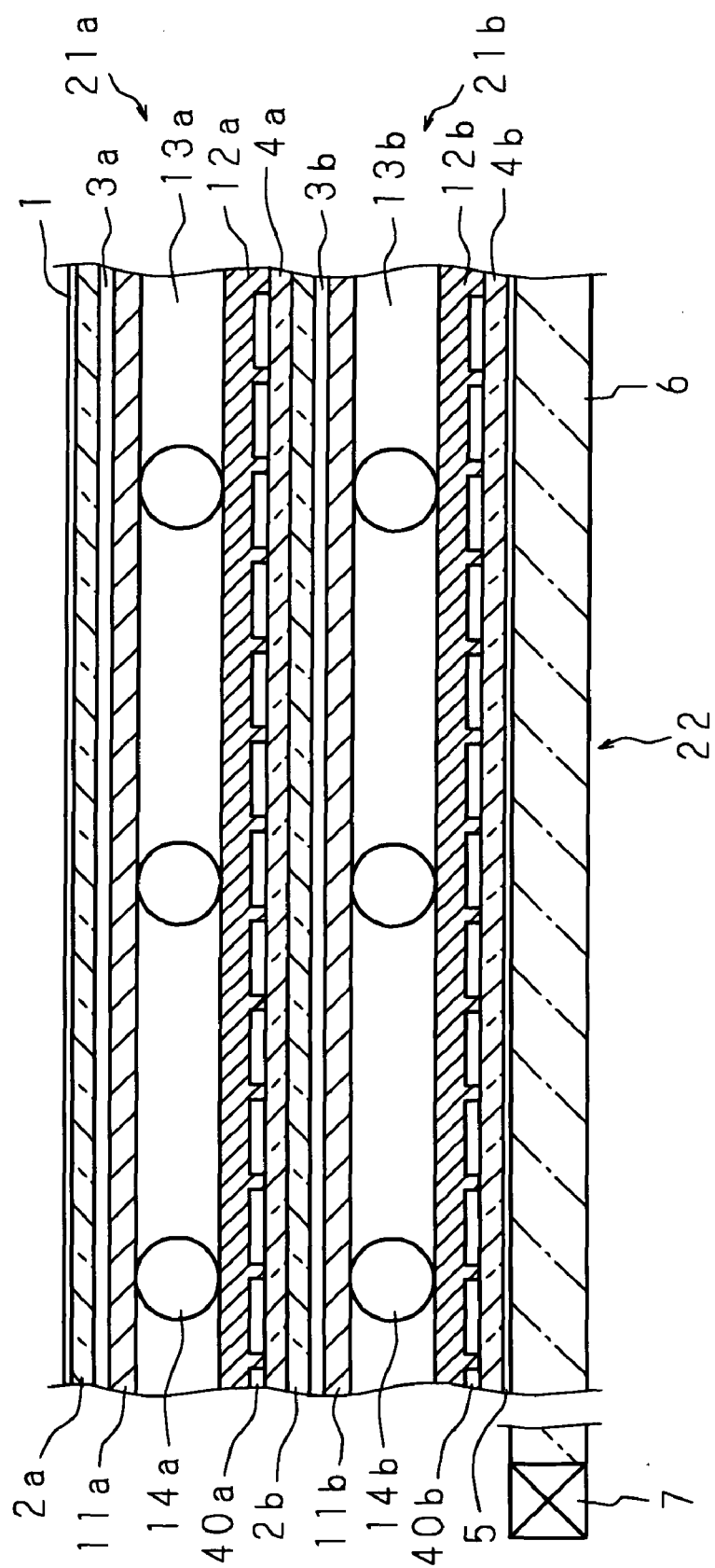
FIG. 12 is a schematic sectional view showing the liquid crystal panels and the backlight of a liquid crystal display device according to a third embodiment.
Figure 13:
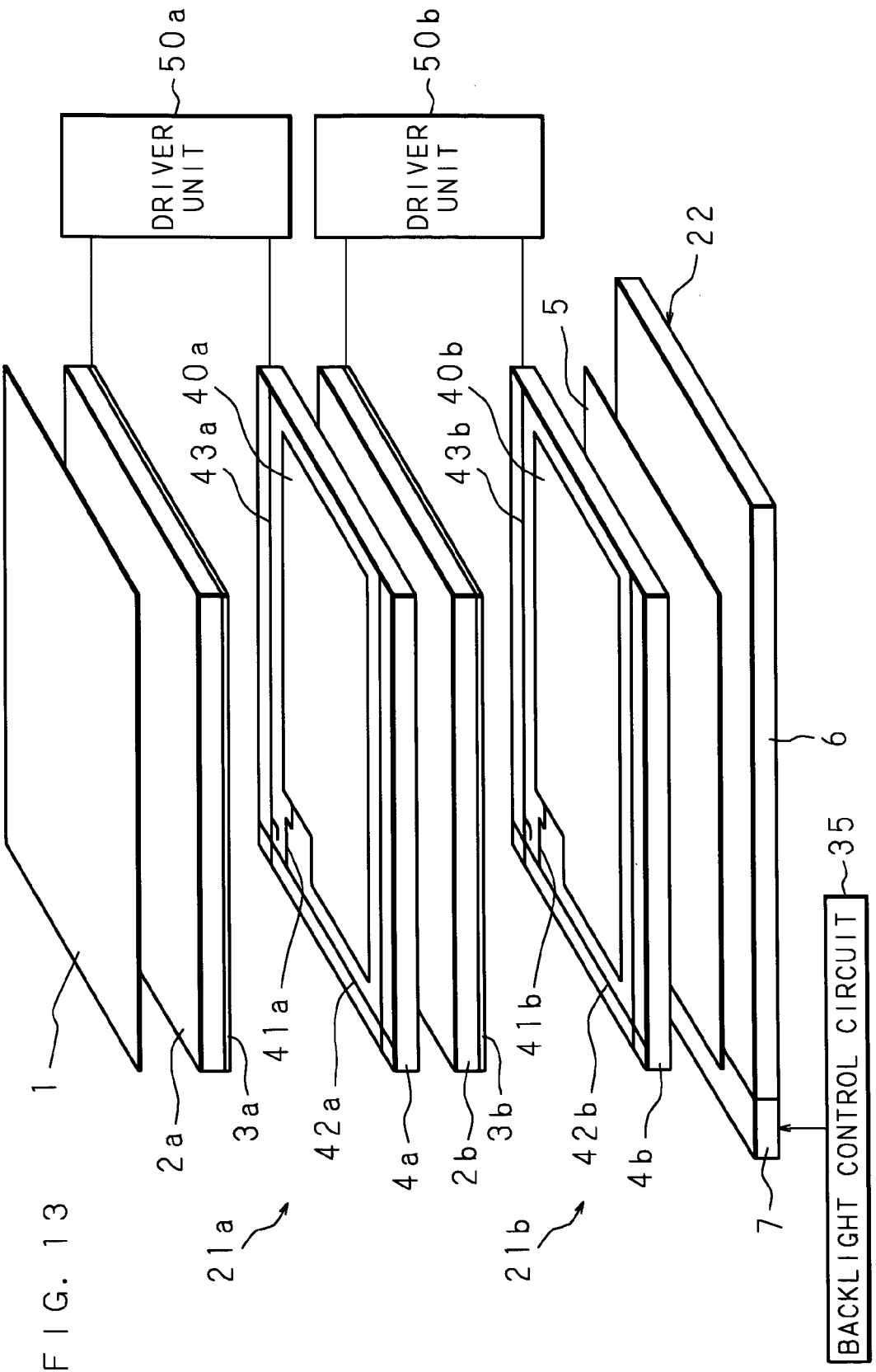
FIG. 13 is a schematic view showing a configuration example of the whole of the liquid crystal display device according to the third embodiment.

FIG. 12 is a schematic sectional view showing the liquid crystal panels and the backlight of a liquid crystal display device according to a third embodiment of the present invention, and FIG. 13 is a schematic view showing a configuration example of the whole of the liquid crystal display device. The third embodiment is a liquid crystal display device that carries out color display according to the field-sequential system, and the circuit configuration of the liquid crystal display device is the same as that of the first embodiment (FIG. 4). In FIGS. 12 and 13, the components identical or similar to those shown in FIGS. 4 to 6 are designated by the same numerals.

The upper/lower relationship of the common electrode and the pixel electrodes is the same between the two liquid crystal panels 21a and 21b, unlike the case of the first embodiment. In addition, in the third embodiment, a ferroelectric liquid crystal having such V-shaped electro-optic response characteristics with respect to the applied voltage as shown in FIG. 14 is used as the liquid crystal material.

As shown in FIGS. 12 and 13, the liquid crystal panel 21a on the upper (front face) side comprises a glass substrate 2a, a common electrode 3a and a glass substrate 4a, which are stacked in this order from the upper layer (front face) side to the lower layer (rear face) side, and pixel electrodes 40a, 40a, ... are formed so as to be arranged in a matrix form on the common electrode 3a side of the glass substrate 4a. An alignment film 12a is disposed on the upper faces of the pixel electrodes 40a, 40a, ... located on the glass substrate 4a, an alignment film 11a is disposed on the lower face of the common electrode 3a, and the space between these alignment films 11a and 12a is filled with a liquid crystal material to form a liquid crystal layer 13a. Like the liquid crystal panel 21a, the liquid crystal panel 21b on the lower layer (rear face) side comprises a glass substrate 2b, a common electrode 3b and a glass substrate 4b, which are stacked in this order from the upper layer (front face) side to the lower layer (rear face) side, and pixel electrodes 40b, 40b, ... arranged in a matrix form on the common electrode 3b side of the glass substrate 4b. An alignment film 12b is disposed on the upper faces of the pixel electrodes 40b, 40b, ... located on the glass substrate 4b, an alignment film 11b is disposed on the upper face of the common electrode 3b, and the space between these alignment films 11b and 12b is filled with the liquid crystal material to form a liquid crystal layer 13b.

A specific example of the liquid crystal display device according to the third embodiment will be described. After a TFT substrate having the pixel electrodes 40a, 40a, ... (40b, 40b, ... ) (pixel number: 800×600, diagonal size: 4 inches) and the glass substrate 2a (2b) having the common electrode 3a (3b) were washed, they were coated with polyimide and baked for one hour at 200° C. to form polyimide films of approximately 200 Å as the alignment films 11a and 12a (11b and 12b). Furthermore, these alignment films were rubbed with a rayon cloth, and an empty panel was produced by stacking the two substrates so that a gap was maintained therebetween using the spacers 14a (14b) made of silica having an average particle size of 1.6 μm. A monostable ferroelectric liquid crystal material (a material obtained by adding 6 wt % of a photo-polymerized monomer, UCL-003, produced by Dainippon Ink and Chemicals, Incorporated, to a ferroelectric liquid crystal material, FELIX-4851/100, produced by Clariant) having such V-shaped electro-optic response characteristics as shown in FIG. 14 was sealed between the alignment films 11a and 12a (11b and 12b) of the empty panel to form the liquid crystal layer 13a (13b). The magnitude of spontaneous polarization of the sealed ferroelectric liquid crystal material was 22 nC/cm$^2$. Furthermore, after the sealing, ultraviolet light (having a wavelength of 365 nm and an intensity of 2 mW/cm$^2$) was irradiated for 5 minutes while a triangular voltage of ±10 V and 2 kHz was applied at the temperature wherein the liquid crystal phase was the chiral smectic C phase, whereby a uniform liquid crystal alignment state was attained.

The driver ICs shown in FIG. 4 and the control circuits capable of carrying out the field-sequential type display, shown in FIG. 15, were connected to the liquid crystal panel 21a (21b) produced. The two liquid crystal panels 21a and 21b provided with the driver ICs and the control circuits described above were stacked, the stack was sandwiched between the pair of polarization plates 1 and 5 being in the crossed nicols state, and this was further stacked with the backlight 22 in which the LED array 7 capable of carrying out red/green/blue monochromatic surface-emitting switching is used as a light source. Because the two liquid crystal panels 21a and 21b were closely attached, the distance between the display areas is equal to the thickness of the two glass substrates (0.7×2=1.4 mm).

The pair of polarization plates 1 and 5 in the crossed nicols state was adjusted so that black image was displayed when a black image signal was sent to the two liquid crystal panels 21a and 21b and when the optical axes of the two liquid crystal panels 21a and 21b were aligned.

In addition, the average change in the direction of the optical axis, obtained from the alignment state of the liquid crystal molecules with respect to the applied voltage, that is, the change in the direction of the long axis of the liquid crystal molecules with respect to the applied voltage, is made different between the two liquid crystal panels 21a and 21b by making the direction of the electric field of the voltage applied to the pixels different between the two liquid crystal panels.

Three-dimensional image display was carried out using the two liquid crystal panels 21a and 21b according to the drive sequence shown in FIG. 15. In the case that the display on the liquid crystal panel 21a was superimposed on the display on the liquid crystal panel 21b, for the purpose of obtaining a three-dimensional feeling, the image of an object located at a long distance was displayed on the liquid crystal panel 21b on the lower (rear face) side, the image of an object located at a short distance was displayed on the liquid crystal panel 21a on the upper (front face) side, and the image of an object located at an intermediate distance was displayed in a state in which the brightness levels of the two liquid crystal panels 21a and 21b were adjusted to provide a feeling of depth.

As a result, high-resolution image display being excellent in the purity of display colors and having a fully three-dimensional feeling can be attained.

In the third embodiment described above, although a liquid crystal display device that carries out color display according to the field-sequential system has been described, it is a matter of course that the configuration wherein the upper/lower relationship of the common electrode and the pixel electrodes is the same between the two liquid crystal panels 21a and 21b and a ferroelectric liquid crystal having V-shaped electro-optic response characteristics is used is also applicable to a liquid crystal display device that carries out color display according to the color filter system.

In addition, although a ferroelectric liquid crystal having V-shaped electro-optic response characteristics is used, it is obvious that similar effects can also be obtained in the configuration wherein a liquid crystal material having half-V-shaped electro-optic response characteristics is used and the direction of the electric field during alignment processing is made different between the upper and lower liquid crystal panels.

In the respective embodiments described above, although a configuration wherein two liquid crystal panels are stacked has been described, it is a matter of course that the present invention is also applicable to a liquid crystal display device wherein three or more liquid crystal panels are stacked.

Furthermore, although a configuration wherein a ferroelectric liquid crystal material having spontaneous polarization is used has been described as an example, when another liquid crystal material having spontaneous polarization, such as a non-ferroelectric liquid crystal material, is used, or even when a nematic liquid crystal material having no spontaneous polarization is used, it is needless to say that effects similar to those of the ferroelectric liquid crystal material are obtained when the alignment states of the liquid crystal molecules are nearly parallel with the substrate according to the IPS system.

Moreover, although a transmissive liquid crystal display device has been described, the present invention is similarly applicable to a reflective or semi-transmissive liquid crystal display device. The reflective or semi-transmissive liquid crystal display device is low in power consumption because display is possible without using a light source, such as a backlight.

INDUSTRIAL APPLICABILITY

As detailed above, in the present invention, because the average change in the direction of the optical axis due to the response of the liquid crystal molecules with respect to the applied voltage, that is, the change in the direction of the long axis of the liquid crystal molecules with respect to the applied voltage, is made different among the stacked multiple liquid crystal panels, the desired brightness can easily be obtained from a liquid crystal display device that carries out image display using stacked multiple liquid crystal panels, more particularly, from a liquid crystal display device comprising stacked multiple liquid crystal panels made of a liquid crystal material containing liquid crystal molecules arranged in nearly parallel with the substrate and having spontaneous polarization, or from a liquid crystal display device comprising stacked multiple liquid crystal panels according to the IPS system.

What is claimed is:

1. A liquid crystal display device, comprising:
   stacked multiple liquid crystal panels, each of which comprises a sealed liquid crystal material; and
   a voltage applying unit that applies a voltage to the stacked multiple liquid crystal panels, wherein
   the sealed liquid crystal material has an average direction of optical axis that changes in response of liquid crystal molecules with respect to the voltage applied on the multiple liquid crystal panels by the voltage applying unit, and the changed average direction of the sealed liquid crystal material comprised by one of the stacked multiple liquid crystal panels is different from the changed average direction of the sealed liquid crystal material comprised by another of the stacked multiple liquid crystal panels.

2. The liquid crystal display device according to claim 1, wherein the alignment states of the liquid crystal molecules are nearly parallel with said substrates.

3. The liquid crystal display device according to claim 1, wherein the multiple liquid crystal panels are stacked while a predetermined distance is provided therebetween.

4. The liquid crystal display device according to claim 1, wherein pixel electrodes and a common electrode are formed on the substrates of the multiple liquid crystal panels, the substrates being opposed to each other, and the positional relationship of the substrate on which the pixel electrodes are formed and the substrate on which the common electrode is formed is different among the multiple liquid crystal panels.

5. The liquid crystal display device according to claim 1, wherein the direction of the electric field of the voltage applied to the overlaid portion of the multiple liquid crystal panels is different among the multiple liquid crystal panels.

6. The liquid crystal display device according to claim 1, wherein the liquid crystal material is a liquid crystal material having spontaneous polarization.

7. The liquid crystal display device according to claim 6, wherein the liquid crystal material is a ferroelectric liquid crystal material.

8. The liquid crystal display device according to claim 1, wherein said liquid crystal material is a nematic liquid crystal material.

9. The liquid crystal display device according to claim 1, wherein color display is carried out according to a field-sequential system.

10. The liquid crystal display device according to claim 1, wherein color display is carried out according to a color-filter system.

* * * * *